US012648561B2

(12) United States Patent
Shen et al.

(10) Patent No.: US 12,648,561 B2
(45) Date of Patent: Jun. 9, 2026

(54) COMPOSITE QUATERNARY AMMONIUM SALT DISINFECTANT AND METHOD FOR PREPARING THE SAME

(71) Applicant: BEIJING SHUNXING BIOTECH CO., LTD., Beijing (CN)

(72) Inventors: Wei Shen, Beijing (CN); Jinghai Xu, Beijing (CN)

(73) Assignee: BEIJING SHUNXING BIOTECH CO., LTD., Beijing (CN)

( * ) Notice: Subject to any disclaimer, the term of this patent is extended or adjusted under 35 U.S.C. 154(b) by 698 days.

(21) Appl. No.: 18/051,858

(22) Filed: Nov. 1, 2022

(65) Prior Publication Data

US 2023/0090517 A1 Mar. 23, 2023

Related U.S. Application Data

(63) Continuation of application No. PCT/CN2021/140734, filed on Dec. 23, 2021.

(30) Foreign Application Priority Data

Dec. 23, 2020 (CN) ......................... 202011538060.0

(51) Int. Cl.

| | |
|---|---|
| ***A01N 33/12*** | (2006.01) |
| ***A01N 31/02*** | (2006.01) |
| ***A01N 35/04*** | (2006.01) |
| ***A01N 43/72*** | (2006.01) |
| ***A01P 1/00*** | (2006.01) |

(52) U.S. Cl.

CPC ............. *A01N 33/12* (2013.01); *A01N 31/02* (2013.01); *A01N 35/04* (2013.01); *A01N 43/72* (2013.01); *A01P 1/00* (2021.08)

(58) Field of Classification Search

CPC ................................ A01N 33/12; A01N 43/80

See application file for complete search history.

(56) References Cited

U.S. PATENT DOCUMENTS

| | | | | |
|---|---|---|---|---|
| 4,173,643 A * | 11/1979 | Law | ........................ | A01N 43/80 514/372 |
| 4,336,152 A * | 6/1982 | Like | ........................ | A01N 25/32 514/642 |
| 2002/0111282 A1* | 8/2002 | Charaf | .................... | A01N 43/08 510/130 |
| 2007/0260089 A1* | 11/2007 | Sauer | .................... | C07C 209/12 564/281 |

FOREIGN PATENT DOCUMENTS

| | | |
|---|---|---|
| CN | 1426681 A | 7/2003 |
| CN | 101653435 A | 2/2010 |
| CN | 104920386 A | 9/2015 |
| CN | 106818741 A | 6/2017 |
| CN | 107714501 A | 2/2018 |
| CN | 108617650 A | 10/2018 |
| CN | 112042645 A | 12/2020 |
| CN | 112640903 A | 4/2021 |

OTHER PUBLICATIONS

Steizer Hans-Rudiger, Product Information Bardac-114, Oct. 18, 2002, pp. 1-2; retrieved from the Internet: <www.https://oversiz.ru/f/bardac114piseng1002.pdf>.*
STN File REG entry for Registry No. 68439-50-9 (1984).*
STN File REG entry for Registry No. 9002-92-0 (1984).*
STN File REG entry for Registry No. 68213-23-0 (1984).*

* cited by examiner

*Primary Examiner* — John Pak
(74) *Attorney, Agent, or Firm* — HAUPTMAN HAM, LLP

(57) ABSTRACT

A composite quaternary ammonium salt disinfectant includes a double long-chain quaternary ammonium salt, two single long-chain quaternary ammonium salts, a synergist isothiazolinone, a nonionic surfactant fatty alcohol polyvinyl ether, and water, wherein the double long-chain quaternary ammonium salt is dialkyl dimethyl ammonium chloride with dialkyl being two independent alkyl groups with a chain length of C8-C18, and the two single-chain quaternary ammonium salts are alkyl dimethyl benzyl ammonium chloride with an alkyl chain length of C8-C18 and alkyl dimethyl ethyl benzyl ammonium chloride with an alkyl chain length of C8-C18, respectively. The composite quaternary ammonium salt disinfectant has a synergistic effect among its components, which greatly improves the capacity of resisting interferences by hard water and organics; and can kill not only bacterial propagules, lipophilic viruses (enveloped viruses, such as novel coronavirus) and fungi, but also hydrophilic viruses (non-enveloped viruses).

7 Claims, No Drawings

COMPOSITE QUATERNARY AMMONIUM SALT DISINFECTANT AND METHOD FOR PREPARING THE SAME

CROSS-REFERENCE TO RELATED APPLICATIONS

The present invention is a Continuation of International Application No. PCT/CN2021/140734, filed Dec. 23, 2021, and claims priority to Chinese patent application No. 202011538060.0, filed on Dec. 23, 2020, and entitled "Composite quaternary ammonium salt disinfectant and method for preparing the same", which are hereby incorporated by reference herein in their entireties.

TECHNICAL FIELD

The invention relates to the field of disinfectants, and in particular to a composite quaternary ammonium salt disinfectant and a method for preparing the same.

BACKGROUND ART

In recent years, new and sudden enveloped viruses, such as influenza, SARS, Middle East respiratory syndrome, Hog cholera, Ebola, and novel coronavirus, have posed a serious threat to human life and property. In the absence of specific drugs and vaccines, regular disinfection in public places and strengthening personal daily protection have been proved to be one of the effective means to control the rapid spread of novel coronavirus so far.

According to the list of disinfectants against novel coronavirus issued by EPA, a quaternary ammonium salt disinfectant accounts for a large proportion, which is an important disinfectant to combat the epidemic. Quaternary ammonium salts are a class of cationic surfactants, and the common quaternary ammonium salts have the general structural formula as follows:

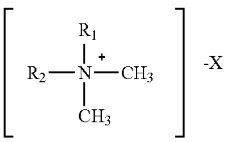

wherein, $R_1$-$R_2$ represent organic groups, including alkyl, aryl, etc., which combine with a nitrogen atom to form a cationic group serving as an effective bactericidal part, and X is an anion, such as halogen, sulfate, or other analogs. In quaternary ammonium salts serving as disinfectants, $R_1$ is usually an alkyl group with a chain length of C8-C18, and $R_2$ is usually an aryl (for example, benzyl, ethyl benzyl) or alkyl group with a chain length of C8-C18. Quaternary ammonium salts, in which only one of $R_1$ and $R_2$ is long alkyl chain, are called single long-chain quaternary ammonium salts, such as alkyl dimethyl benzyl ammonium chloride and alkyl dimethyl ethyl benzyl ammonium chloride; and quaternary ammonium salts with both $R_1$ and $R_2$ being long alkyl chains are called double long-chain quaternary ammonium salts.

The combination of a traditional double long-chain quaternary ammonium salt and a single long-chain quaternary ammonium salt shows poor killing effect on hydrophilic viruses, and the killing effect of quaternary ammonium salt disinfectants is easily interfered by pollutants, such as hard water and organic pollutants, with the speed of kill needing further improvement.

SUMMARY OF THE INVENTION

Object of the Invention

One object of the invention is to provide a composite quaternary ammonium salt disinfectant and a method for preparing the same. The composite quaternary ammonium salt disinfectant has a synergistic effect among its components, which greatly improves the capacity of resisting interferences by hard water and organics, and can kill not only bacterial propagules, lipophilic viruses (enveloped viruses, such as novel coronavirus) and fungi, but also hydrophilic viruses (non-enveloped viruses). In addition, the composite quaternary ammonium salt disinfectant provided by the invention has a rapid speed of kill.

Technical Solutions

In order to achieve the object of the invention, the technical solutions provided by the invention are as follows:

A composite quaternary ammonium salt disinfectant is provided, which is prepared from raw materials comprising: a double long-chain quaternary ammonium salt, two single long-chain quaternary ammonium salts, a synergist isothiazolinone, a nonionic surfactant fatty alcohol polyvinyl ether, and water;

the double long-chain quaternary ammonium salt is dialkyl dimethyl ammonium chloride, in which dialkyl is two independent alkyl groups with a chain length of C8-C18; and the two single-chain quaternary ammonium salts are alkyl dimethyl benzyl ammonium chloride with an alkyl chain length of C8-C18 and alkyl dimethyl ethyl benzyl ammonium chloride with an alkyl chain length of C8-C18, respectively.

In one possible embodiment of the composite quaternary ammonium salt disinfectant, the double long-chain quaternary ammonium salt is one or more selected from the group consisting of didecyl dimethyl ammonium chloride, dioctyl dimethyl ammonium chloride, octyl decyl dimethyl ammonium chloride, didodecyl dimethyl ammonium chloride, ditetradecyl dimethyl ammonium chloride, and dihexadecyl dimethyl ammonium chloride;

optionally, the double long-chain quaternary ammonium salt is one or more selected from the group consisting of didecyl dimethyl ammonium chloride, dioctyl dimethyl ammonium chloride, octyl decyl dimethyl ammonium chloride, and didodecyl dimethyl ammonium chloride; further optionally, the double long-chain quaternary ammonium salt is one or more selected from the group consisting of didecyl dimethyl ammonium chloride, dioctyl dimethyl ammonium chloride, and octyl decyl dimethyl ammonium chloride.

In one possible embodiment of the composite quaternary ammonium salt disinfectant, alkyl dimethyl benzyl ammonium chloride with an alkyl chain length of C8-C18 is alkyl dimethyl benzyl ammonium chloride with an alkyl chain length of C10-C16, optionally alkyl dimethyl benzyl ammonium chloride with an alkyl chain length of C12-C16, and further optionally dodecyl dimethyl benzyl ammonium chloride;

and/or, alkyl dimethyl ethyl benzyl ammonium chloride with an alkyl chain length of C8-C18 is alkyl dimethyl ethyl benzyl ammonium chloride with an alkyl chain length of C10-C16, optionally alkyl dimethyl ethyl benzyl ammonium chloride with an alkyl chain length of C12-C14. In one possible embodiment of the composite quaternary ammonium salt disinfectant, the mass ratio of the double long-chain quaternary ammonium salt to the two single long-chain quaternary ammonium salts is 1: 0.20-1.0: 0.20-1.0.

In one possible embodiment of the composite quaternary ammonium salt disinfectant, the isothiazolinone is one or more selected from the group consisting of Kathon, 2-methyl-4-isothiazolin-3-one, 2-octyl-4-isothiazolin-3-one, and 1,2-benzisothiazolin-3-one; and/or, the fatty alcohol polyvinyl ether is AEO9 or AEO10.

In one possible embodiment of the composite quaternary ammonium salt disinfectant, the composite quaternary ammonium salt disinfectant further comprises one or more synergists selected from urotropine and o-phthalaldehyde;

and/or, the composite quaternary ammonium salt disinfectant further comprises one or more nonionic surfactants selected from glycosides, poloxamer, and polyvinyl alcohol. In one possible embodiment of the composite quaternary ammonium salt disinfectant, the total concentration of the double long-chain quaternary ammonium salt and two single long-chain quaternary ammonium salts in the composite quaternary ammonium salt disinfectant ranges from 2.0 g/L to 200 g/L (w/v), optionally from 5.0 g/L to 150 g/L (w/v), and further optionally from 10 g/L to 100 g/L (w/v).

In one possible embodiment of the composite quaternary ammonium salt disinfectant, the content of the synergist ranges from 0.01% to 1.0% (w/w), optionally from 0.02% to 0.5% (w/w), and further optionally from 0.03% to 0.3% (w/w);

and/or, the content of the nonionic surfactant ranges from 1.0% to 20% (w/w), optionally from 1.5% to 15% (w/w), and further optionally from 2.0% to 10% (w/w).

In one possible embodiment of the composite quaternary ammonium salt disinfectant, the composite quaternary ammonium salt disinfectant further comprises a pH modifier and/or alcohols or analogues;

the pH modifier is two or more selected from the group consisting of EDTA-4Na, EDTA-2Na, EDTA, potassium dihydrogen phosphate, dipotassium hydrogen phosphate, sodium dihydrogen phosphate and disodium hydrogen phosphate; optionally, the pH modifier is two or more selected from the group consisting of EDTA-4Na, EDTA-2Na, EDTA, potassium dihydrogen phosphate and dipotassium hydrogen phosphate; further optionally, the pH modifier is selected from two or three of EDTA-4Na, EDTA-2Na and EDTA;

and the alcohols or analogues are one or more selected from the group consisting of ethanol, propanol, isopropanol, dipropylene glycol, dipropylene glycol propyl ether, dipropylene glycol butyl ether, ethylene glycol, 1,2-propylene glycol, 1,3-propylene glycol, 1,2-butylene glycol, 1,2-pentanediol, 1,2-hexanediol, 1,2-heptanediol, 1,2-octanediol, 1,2-nonanediol, and 1,2-decanediol; optionally, the alcohols or analogues include one or more of ethanol, dipropylene glycol, dipropylene glycol propyl ether, dipropylene glycol butyl ether, ethylene glycol, 1,2-butanediol, 1,2-pentanediol, 1,2-hexanediol, 1,2-heptanediol, 1,2-octanediol, 1,2-nonanediol, and 1,2-decanediol; further optionally, the alcohols or analogues include one or more of ethanol, dipropylene glycol, dipropylene glycol propyl ether, dipropylene glycol butyl ether, 1,2-hexanediol and 1,2-octanediol. In one possible embodiment of the composite quaternary ammonium salt disinfectant, the content of the alcohols or analogues ranges from 0.5% to 15% (w/w), optionally from 0.8% to 10% (w/w), and further optionally from 1.0% to 8% (w/w);

and/or, the content of the pH modifier ranges from 0.2% to 15% (w/w), optionally from 0.5% to 10% (w/w), and further optionally from 2% to 5% (w/w).

The invention also provides a method for preparing the composite quaternary ammonium salt disinfectant, which comprises the steps of dissolving each component in purified water and stirring; optionally, the method further comprises the step of dilution after stirring and dissolving.

Beneficial Effects (1) The composite quaternary ammonium salt disinfectant provided by the invention is composed of a double long-chain quaternary ammonium salt, two single long-chain quaternary ammonium salts, a synergist and a nonionic surfactant, showing a synergistic effect among the components. The composite quaternary ammonium salt disinfectant provided by the invention has a higher anti-interference capacity compared to the traditional combination of a double long-chain quaternary ammonium salt and a single long-chain quaternary ammonium salt, which greatly improves the capacity of resisting interference by hard water, and can be directly diluted with tap water for using within 72 hours after dilution without affecting the killing capability on microorganisms. The composite quaternary ammonium salt disinfectant provided by the invention also greatly improves the capacity of resisting interference by organics, and can still kill Pseudomonas aeruginosa at the action time of 2 min in the case of interference by 50% calf serum, showing an excellent capacity of resisting interference by organics.

At the same time, the composite quaternary ammonium salt disinfectant provided by the invention can kill not only bacterial propagules, lipophilic viruses (enveloped viruses) and fungi, but also hydrophilic viruses (non-enveloped viruses). In addition, the composite quaternary ammonium salt disinfectant provided by the invention is capable of killing novel coronavirus rapidly in a test. The results show that the composite quaternary ammonium salt disinfectant provided by the invention can also rapidly kill novel coronavirus (2019-nCoV) and coronavirus (GX-P2V) in 30 s, 1 min and 3 min, with the killing logarithmic value being greater than 4.

The composite quaternary ammonium salt disinfectant provided by the invention has a higher speed of kill than the traditional combination of a double long-chain and a single long-chain quaternary ammonium salts.

(2) The composite quaternary ammonium salt disinfectant provided by the invention has the following advantages: easy to use, non-toxic, non-irritative, non-corrosive, resistant to interference by hard water, etc., and can be used for disinfecting various surfaces, air, hands, skin, mucous membranes, etc., as well as water bodies, aquaculture industries and other fields, which is suitable for large-scale promotion. The method for preparing the composite quaternary ammonium salt disinfectant provided by the invention is the method for preparing a disinfectant stock solution, which, during use in practice, can be used only by diluting to a specified concentration in proportion. Therefore, the quaternary ammonium salt disinfectant prepared by diluting the stock solution should also fall within the scope of the invention.

DETAILED DESCRIPTION OF THE INVENTION

In order to make the object, technical solutions and advantages of the invention clearer, the technical solutions in the embodiments of the invention will be described clearly and completely, obviously, the described embodiments are some of the embodiments of the present invention, but not all of them. Based on the embodiments of the present invention, all other embodiments obtained by those of ordinary skill in the art without creative work are within the scope of the present invention. In addition, in order to better explain the present invention, a lot of specific details are given in the following embodiments. It will be understood by those skilled in the art that the present invention may be practiced without certain specific details. In some embodiments, materials, elements, methods, means, etc., well known to those skilled in the art, are not described in detail so as to highlight the spirit of the present invention.

Throughout the specification and claims, the term "comprising" or variations thereof, such as "including" or "containing" and the like, will be understood to include the stated elements or components and not to exclude other elements or other components, unless expressly indicated otherwise.

In the following examples, all the raw materials used are common commercially available raw materials, as shown in Table 1:

TABLE 1

List of raw materials

| Name | CAS | Content | Supplier |
|---|---|---|---|
| Didecyl dimethyl ammonium chloride | 7173-51-5 | ≥70% | Shanghai Yuyu New Material Technology Co., Ltd. |
| Octyl decyl dimethyl ammonium chloride | 32426-11-2 | ≥70% | Shanghai Yuyu New Material Technology Co., Ltd. |
| Dioctyl dimethyl ammonium chloride | 5538-94-3 | ≥70% | Shanghai Yuyu New Material Technology Co., Ltd. |
| Dodecyl dimethyl benzyl ammonium chloride | 139-07-1 | ≥50% | Shanghai Yuyu New Material Technology Co., Ltd. |
| C12-C16 alkyl dimethyl benzyl ammonium chloride | 68424-85-1 | ≥50% | Shanghai Yuyu New Material Technology Co., Ltd. |
| C12-C14 alkyl dimethyl ethyl benzyl ammonium chloride | 85409-23-0 | ≥50% | Shanghai Yuyu New Material Technology Co., Ltd. |
| Kathon (a mixture of CMIT and MIT, CMIT:MIT = 3:1) | — | ≥14% | Dalian Baiao Chemical Co., Ltd. |
| MIT (2-methyl-4-isothiazolin-3 -one) | 2682-20-4 | ≥50% | Dalian Baiao Chemical Co., Ltd. |
| OIT (2-octyl-4-isothiazolin-3-one) | 26530-20-1 | ≥45% | Dalian Baiao Chemical Co., Ltd. |
| BIT (1,2-benziso-thiazolin-3-one) | 2634-33-5 | ≥20% | Dalian Baiao Chemical Co., Ltd. |
| Urotropine | 100-97-0 | ≥98% | China National Pharmaceutical Group Co., Ltd. |
| o-Phthalaldehyde | 643-79-8 | ≥98% | China National Pharmaceutical Group Co., Ltd. |
| AEO9 (fatty alcohol polyoxyethylene ether (C12-C14 alcohol)) | 68439-50-9 | ≥98% | Shanghai Yuyu New Material Technology Co., Ltd. |
| Poloxamer 188 | 9003-11-6 | 95.0%-102.0% | Shanghai Yuyu New Material Technology Co., Ltd. |
| EDTA-4Na | 13235-36-4 | ≥99% | China National Pharmaceutical Group Co., Ltd. |
| EDTA-2Na | 139-33-3_ | ≥99% | China National Pharmaceutical Group Co., Ltd. |
| EDTA | 60-00-4 | ≥99% | China National Pharmaceutical Group Co., Ltd. |
| Dipotassium hydrogen phosphate | 7758-11-4 | ≥99% | China National Pharmaceutical Group Co., Ltd. |
| Potassium dihydrogen phosphate | 7778-77-0 | ≥99% | China National Pharmaceutical Group Co., Ltd. |
| Ethanol | 64-17-5 | ≥99% | China National Pharmaceutical Group Co., Ltd. |
| Ethylene glycol | 107-21-1 | ≥99% | China National Pharmaceutical Group Co., Ltd. |
| Dipropylene glycol | 110-98-5 | ≥98% | China National Pharmaceutical Group Co., Ltd. |
| Dipropylene glycol butyl ether | 29911-28-2 | ≥98% | Shanghai Yuyu New Material Technology Co., Ltd. |
| 1,2-Octanediol | 1117-86-8 | ≥98% | Shanghai Yuyu New Material Technology Co., Ltd. |
| Water | 7732-18-5 | Purified Water | Homemade |

EXAMPLE 1

Didecyl dimethyl ammonium chloride (2.86 g), dodecyl dimethyl benzyl ammonium chloride (4.0 g), C12-C14 alkyl dimethyl ethyl benzyl ammonium chloride (4.0 g), Kathon (0.5 g), AEO9 (4.0 g), EDTA-4Na (2.4 g), EDTA-2Na (0.8 g), and ethanol (1.0 g) were dissolved in purified water (80.44 g) with stirring, to prepare a stock solution of composite quaternary ammonium salt disinfectant, which was diluted by 40 times for use in various tests in the application.

EXAMPLE 2

Didecyl dimethyl ammonium chloride (2.86 g), dodecyl dimethyl benzyl ammonium chloride (4.0 g), C12-C14 alkyl dimethyl ethyl benzyl ammonium chloride (4.0 g), Kathon (0.1 g), AEO9 (4.0 g), EDTA-4Na (2.4 g), EDTA-2Na (0.8 g), and ethanol (1.0 g) were dissolved in purified water (80.84 g) with stirring, to prepare a stock solution of composite quaternary ammonium salt disinfectant, which was diluted by 40 times for use in various tests in the application.

EXAMPLE 3

Didecyl dimethyl ammonium chloride (2.86 g), dodecyl dimethyl benzyl ammonium chloride (4.0 g), C12-C14 alkyl dimethyl ethyl benzyl ammonium chloride (4.0 g), Kathon (0.5 g), urotropine (2.5 g), AEO9 (4.0 g), EDTA-4Na (2.4 g), EDTA-2Na (0.8 g), and octanediol (2.0 g) were dissolved in purified water (76.94 g) with stirring, to prepare a stock solution of composite quaternary ammonium salt disinfectant, which was diluted by 40 times for use in various tests in the application.

7

EXAMPLE 4

Didecyl dimethyl ammonium chloride (2.86 g), C12-C16 alkyl dimethyl benzyl ammonium chloride (4.0 g), C12-C14 alkyl dimethyl ethyl benzyl ammonium chloride (4.0 g), MIT (0.25 g), urotropine (1.25 g), AEO9 (4.0 g), EDTA-4Na (2.4 g), EDTA-2Na (0.4 g), EDTA (0.4 g), octanediol (1.0 g), and ethanol (1.0 g) were dissolved in purified water (78.44 g) with stirring, to prepare a stock solution of composite quaternary ammonium salt disinfectant, which was diluted by 40 times for use in various tests in the application.

EXAMPLE 5

Didecyl dimethyl ammonium chloride (1.43 g), dioctyl dimethyl ammonium chloride (1.43 g), dodecyl dimethyl benzyl ammonium chloride (4.0 g), C12-C14 alkyl dimethyl ethyl benzyl ammonium chloride (4.0 g), MIT (0.5 g), AEO9 (4.0 g), EDTA-4Na (2.4 g), EDTA-2Na (0.8 g), and ethanol (1.0 g) were dissolved in purified water (80.44 g) with stirring, to prepare a stock solution of composite quaternary ammonium salt disinfectant, which was diluted by 40 times for use in various tests in the application.

EXAMPLE 6

Didecyl dimethyl ammonium chloride (1.28 g), octyl decyl dimethyl ammonium chloride (2.56 g), dioctyl dimethyl ammonium chloride (1.28 g), C12-C16 alkyl dimethyl benzyl ammonium chloride (2.4 g), C12-C14 alkyl dimethyl ethyl benzyl ammonium chloride (2.4 g), MIT (0.5 g), AEO9 (4.0 g), EDTA-4Na (2.4 g), EDTA-2Na (0.8 g), and dipropylene glycol (1.0 g) were dissolved in purified water (81.38 g) with stirring, to prepare a stock solution of composite quaternary ammonium salt disinfectant, which was diluted by 40 times for use in various tests in the application.

EXAMPLE 7

Didecyl dimethyl ammonium chloride (1.28 g), octyl decyl dimethyl ammonium chloride (2.56 g), dioctyl dimethyl ammonium chloride (1.28 g), dodecyl dimethyl benzyl ammonium chloride (2.4 g), C12-C14 alkyl dimethyl ethyl benzyl ammonium chloride (2.4 g), Kathon (0.5 g), AEO9 (4.0 g), EDTA-4Na (2.4 g), EDTA-2Na (0.8 g), octanediol (2.0 g), and ethanol (10.0 g) were dissolved in purified water (70.38 g) with stirring, to prepare a stock solution of composite quaternary ammonium salt disinfectant, which was diluted by 40 times for use in various tests in the application.

EXAMPLE 8

Didecyl dimethyl ammonium chloride (2.86 g), dodecyl dimethyl benzyl ammonium chloride (4.0 g), C12-C14 alkyl dimethyl ethyl benzyl ammonium chloride (4.0 g), o-phthalaldehyde (1.25 g), MIT (0.25 g), poloxamer 188 (2.0 g), AEO9 (2.0 g), EDTA-4Na (2.4 g), EDTA-2Na (0.8 g), dipropylene glycol (4.0 g), and octanediol (2.0 g) were dissolved in purified water (74.44 g) with stirring, to prepare a stock solution of composite quaternary ammonium salt disinfectant, which was diluted by 40 times for use in various tests in the application.

EXAMPLE 9

Didecyl dimethyl ammonium chloride (0.72 g), octyl decyl dimethyl ammonium chloride (1.44 g), dioctyl dimethyl ammonium chloride (0.72 g), C12-C16 alkyl dimethyl benzyl ammonium chloride (4.0 g), C12-C14 alkyl dimethyl

8 ethyl benzyl ammonium chloride (4.0 g), BIT (0.5 g), urotropine (0.5 g), AEO9 (4.0 g), dipotassium hydrogen phosphate (2.0 g), potassium dihydrogen phosphate (1.2 g), and ethylene glycol (5.0 g) were dissolved in purified water (75.92 g) with stirring, to prepare a stock solution of composite quaternary ammonium salt disinfectant, which was diluted by 40 times for use in various tests in the application.

EXAMPLE 10

Didecyl dimethyl ammonium chloride (1.43 g), C12-C16 alkyl dimethyl benzyl ammonium chloride (6.0 g), C12-C14 alkyl dimethyl ethyl benzyl ammonium chloride (6.0 g), OIT (0.5 g), AEO9 (2.0 g), poloxamer 188 (2.0 g), EDTA-4Na (2.4 g), EDTA-2Na (0.8 g), 1,2-octanediol (1.0 g), and ethylene glycol (4.0 g) were dissolved in purified water (73.87 g) with stirring, to prepare a stock solution of composite quaternary ammonium salt disinfectant, which was diluted by 40 times for use in various tests in the application.

COMPARATIVE EXAMPLE 1

Didecyl dimethyl ammonium chloride (2.86 g), dodecyl dimethyl benzyl ammonium chloride (4.0 g), C12-C14 alkyl dimethyl ethyl benzyl ammonium chloride (4.0 g), EDTA-4Na (2.4 g), EDTA-2Na (0.8 g), and ethanol (1.0 g) were dissolved in purified water (84.94 g) with stirring, to prepare a stock solution of composite quaternary ammonium salt disinfectant, which was diluted by 40 times for use in various tests in the application.

COMPARATIVE EXAMPLE 2

Didecyl dimethyl ammonium chloride (2.86 g), dodecyl dimethyl benzyl ammonium chloride (8.0 g), Kathon (0.5 g), AEO9 (4.0 g), EDTA-4Na (2.4 g), EDTA-2Na (0.8 g), and ethanol (1.0 g) were dissolved in purified water (80.44 g) with stirring, to prepare a stock solution of composite quaternary ammonium salt disinfectant, which was diluted by 40 times for use in various tests in the application.

COMPARATIVE EXAMPLE 3

Commercially available Dr. Xiao's compound double long-chain quaternary ammonium salt disinfectant is used, which consists of didecyl dimethyl ammonium chloride and octyl decyl dimethyl ammonium chloride, having the content of active ingredients of 1.7-2.0 g/L.

Test 1: Test for Physico-Chemical Indicators

The physico-chemical indicators of the samples of Examples 1-10 were tested respectively by using the samples of Comparative Example 1-3 as the controls. The test items and test methods are shown in Table 2.

TABLE 2

| Test items and methods | |
|---|---|
| Items | Methods |
| Sensory state | Visual inspection under indirect sunlight. |
| Content of active ingredients | According to Appendix A 2.1 of GB 26369. |
| pH value | According to 2.2.1.4 of Technical Standard for Disinfection (2002 edition), pH 4-10. |
| Corrosion to metals | According to 2.2.4 of Technical Standard for Disinfection (2002 edition). |

The results are shown in Table 3.

TABLE 3

Test data for physico-chemical properties

| | Physico-chemical indicators | | | |
|---|---|---|---|---|
| | Sensory state | Content of active ingredients | pH value | Corrosion to metals |
| Comparative example 1 | Colorless transparent liquid, odorless, no visible insoluble matter. | 1.32 g/L | 9.62 | Noncorrosive to stainless steel, and mildly corrosive to carbon steel, copper sheet and aluminum sheet. |
| Comparative example 2 | Colorless transparent liquid, odorless, no visible insoluble matter. | 1.28 g/L | 9.63 | Noncorrosive to stainless steel, and mildly corrosive to carbon steel, copper sheet and aluminum sheet. |
| Comparative example 3 | Colorless transparent liquid, odorless, no visible insoluble matter. | 1.99 g/L | 5.81 | — |
| Example 1 | Light yellow transparent liquid, odorless, no visible insoluble matter. | 1.21 g/L | 8.96 | Noncorrosive to stainless steel, and mildly corrosive to carbon steel, copper sheet and aluminum sheet. |
| Example 2 | Colorless transparent liquid, odorless, no visible insoluble matter. | 1.18 g/L | 9.02 | Noncorrosive to stainless steel, and mildly corrosive to carbon steel, copper sheet and aluminum sheet. |
| Example 3 | Light yellow transparent liquid, odorless, no visible insoluble matter. | 1.23 g/L | 8.85 | Noncorrosive to stainless steel, and mildly corrosive to carbon steel, copper sheet and aluminum sheet. |
| Example 4 | Colorless transparent liquid, odorless, no visible insoluble matter. | 1.22 g/L | 9.01 | Noncorrosive to stainless steel, and mildly corrosive to carbon steel, copper sheet and aluminum sheet. |
| Example 5 | Colorless transparent liquid, odorless, no visible insoluble matter. | 1.19 g/L | 8.68 | Noncorrosive to stainless steel, and mildly corrosive to carbon steel, copper sheet and aluminum sheet. |
| Example 6 | Colorless transparent liquid, odorless, no visible insoluble matter. | 1.21 g/L | 8.93 | Noncorrosive to stainless steel, and mildly corrosive to carbon steel, copper sheet and aluminum sheet. |
| Example 7 | Light yellow transparent liquid, odorless, no visible insoluble matter. | 1.25 g/L | 8.86 | Noncorrosive to stainless steel, and mildly corrosive to carbon steel, copper sheet and aluminum sheet. |
| Example 8 | Colorless transparent liquid, odorless, no visible insoluble matter. | 1.27g/L | 9.05 | Noncorrosive to stainless steel, and mildly corrosive to carbon steel, copper sheet and aluminum sheet. |
| Example 9 | Light yellow transparent liquid, odorless, no visible insoluble matter. | 1.23 g/L | 8.88 | Noncorrosive to stainless steel, and mildly corrosive to carbon steel, copper sheet and aluminum sheet. |
| Example 10 | Colorless transparent liquid, odorless, no visible insoluble matter. | 1.19 g/L | 8.99 | Noncorrosive to stainless steel, and mildly corrosive to carbon steel, copper sheet and aluminum sheet. |

Test 2: Test for Killing Microorganisms

A test for the effect on air disinfection was conducted using the sample of Example 1 as a testing disinfectant according to the method of 2.1.3 in Technical Standard for Disinfection (2002 edition), and the test results are shown in Table 4.

TABLE 4

Test data for killing microorganisms (Air disinfection)

| Disinfectant used | Simulated field test spraying evenly in the test chamber at a disinfectant dosage of 5 mL/$m^3$, then standing for treatment | Field test spraying evenly in an empty office in a volume of about 50 $m^3$ at a disinfectant dosage of 5 mL/$m^3$, then standing for treatment |
|---|---|---|
| Example 1 | In three parallel tests, the killing rates on Staphylococcus albus, *Staphylococcus aureus* and *Escherichia coli* at 5 × $10^5$ CFU/$m^3$ were all ≥ 99.90% after 5 min. | In three parallel tests, the killing rates on natural bacteria in the air were all ≥ 90% after 5 min. |

Test 3: Test for Inactivating Novel Coronavirus (2019-nCoV)

This test was commissioned to Analytical and Testing Center of Capital Regions Co., Ltd. to carry out a test for inactivating novel coronavirus (2019-nCoV) using the composite quaternary ammonium salt disinfectant provided by the inventive embodiment according to the method of 2.1.1.10.7 in Technical Standard for Disinfection (2002 edition), and the data are shown in Table 5.

TABLE 5

Test Data for inactivating novel coronavirus

| | The testing strain was a novel coronavirus (2019-nCoV) |
|---|---|
| Example 1 The active ingredient was 1.21 g/L. | The antiviral activity rate against the novel coronavirus (2019-nCoV) at the action time of 30 s, 1 min and 3 min were all > 99.99%. |

Test 4: Test for Killing Enveloped Virus

This test was commissioned to College of Life Science and Technology, Beijing University of Chemical Technology, to carry out the test for inactivating coronavirus (GX-P2V), which was a novel coronavirus isolated from pangolins, and had 92.2% homology with the spike protein of novel coronavirus (2019-nCoV) and 90% identity in term of the amino acid sequence, thus being suitable as a substitution model for screening anti-novel coronavirus drugs (see Lam, T. T., Jia, N., Zhang, Y. et al. Identifying SARS-CoV-2-related coronaviruses in Malayan Pangolin S. Nature (2020) for the virus and properties thereof. https://doi.org/10.1038/s41586-020-2169-0). The inactivation test was conducted using the sample of Example 1 as a testing disinfectant and a coronavirus (GX-P2V) as a testing virus strain according to the method of 2.1.1.10.7 in Technical Standard for Disinfection (2002 edition), and the test results are shown in Table 6.

TABLE 6

Test data for inactivating coronavirus

| | Microorganism killing indicators (coronavirus (GX-P2V)) |
|---|---|
| Example 1 The active ingredient was 1.21 g/L. | The inactivation efficiency on the coronavirus at the action time of 30 s, 1 min and 3 min were all > 99.99%. |

Test 5: Test for Inactivating Non-Enveloped Virus

The inactivation test was conducted using the sample of Example 1 as a testing disinfectant and poliovirus as a testing virus strain according to the method of 2.1.1.10.7 in Technical Standard for Disinfection (2002 edition), and the test results are shown in Table 7.

Test 7 Test for Inactivating Non-Enveloped Viruses

| | Testing virus strain (poliovirus) |
|---|---|
| Example 1 The active ingredient was 1.21 g/L. | The inactivation efficiency on the poliovirus at the action time of 2.5 min, 5 min and 15 min were all > 99.99%. |

Test 6: Organic Interference Test

The test was conducted by using the samples of Example 1 and Comparative Examples 1 and 2 as disinfectants, according to the method of 2.1.10.2.3 in Technical Standard for Disinfection (2002 edition), in which 0, 25% and 50% calf serum were added, respectively, as organic interferents, and Pseudomonas aeruginosa was used as a testing strain, to study the effect of organics on the sample disinfection, and the results are shown in Table 8.

Test 8 Organic Interference Test

| | Content of | Action time Killing logarithmic value | | | |
|---|---|---|---|---|---|
| | calf serum | 30 s | 1 min | 3 min | 5 min |
| Sample of Example 1 | 0 | ≥5.00 | — | — | — |
| | 25% | ≥5.00 | — | — | — |
| | 50% | 3.52 | 4.68 | ≥5.00 | ≥5.00 |

| | Content of | Action time Killing logarithmic value | | | |
|---|---|---|---|---|---|
| | calf serum | 30 s | 1 min | 3 min | 5 min |
| Sample of Example 8 | 0 | ≥5.00 | — | — | — |
| | 25% | ≥5.00 | — | — | — |
| | 50% | 2.28 | 4.35 | ≥5.00 | ≥5.00 |

-continued

| | Content of calf serum | Action time Killing logarithmic value 5 min | 10 min | 15 min | 20 min |
|---|---|---|---|---|---|
| Sample of | 0 | ≥5.00 | — | — | — |
| Comparative | 25% | 1.82 | 2.28 | 3.54 | ≥5 |
| example 1 | 50% | 1.56 | 2.46 | 2.83 | 3.66 |

| | Content of calf serum | Action time Killing logarithmic value 5 min | 10 min | 15 min | 20 min |
|---|---|---|---|---|---|
| Sample of | 0 | ≥5.00 | — | — | — |
| Comparative | 25% | 1.76 | 2.58 | 3.96 | 4.38 |
| example 2 | 50% | 1.45 | 2.32 | 2.83 | 3.66 |

Under the organic interference, the composite quaternary ammonium salt disinfectants provided by Example 1 and Example 8 of the invention can tolerate the interference of 25% and 50% calf serum, and kill the test strains in a short time, while those provided by the Comparative examples 1 and 2 can not tolerate the interference of 50% calf serum. The composite quaternary ammonium salt disinfectant provided by the example of the invention can be applied more conveniently and has a more extensive application field as compared with Comparative examples 1 and 2.

Test 7: Hard Water Interference Test

The test was conducted according to the method of 2.1.1.2 in Technical Standard for Disinfection (2002 edition), using diluents of the disinfectant stock solutions provided by Example 1, Example 8, Comparative Example 1 and Comparative Example 2 of the application as testing disinfectants, respectively, and Pseudomonas aeruginosa as a testing strain, wherein each of the disinfectant stock solution was diluted by 40 times with common tap water, followed by standing for 72 hours, to obtain the diluent, as shown in Table 9.

TABLE 9

| Hard water interference test | | | |
|---|---|---|---|
| Testing disinfectant | Microorganism killing indicators | | |
| Example 1 | Action time: 30 s, Killing logarithmic value ≥ 5 | Action time: 1 min, Killing logarithmic value ≥ 5 | Action time: 1.5 min, Killing logarithmic value ≥ 5 |
| Example 8 | Action time: 30 s, Killing logarithmic value ≥ 5 | Action time: 1 min, Killing logarithmic value ≥ 5 | Action time: 1.5 min, Killing logarithmic value ≥ 5 |
| Comparative example 1 | Action time: 5 min, Killing logarithmic value is 2.35. | Action time: 10 min, Killing logarithmic value is 3.56. | Action time: 15 min, Killing logarithmic value is 4.05. |
| Comparative example 2 | Action time: 5 min, Killing logarithmic value is 1.85. | Action time: 10 min, Killing logarithmic value is 2.78. | Action time: 15 min, Killing logarithmic value is 3.12. |

Test 8: Test for the Speed of Killing Microorganisms

The tests for killing microorganisms were conducted using the samples of Example 1-10 as testing disinfectants, respectively, and the samples of Comparative Example 1-3 as controls, as well as Staphylococcus aureus, Pseudomonas aeruginosa and Candida albicans as test strains. All the above tests were carried out according to the method of 2.1.1.2 in Technical Standard for Disinfection (2002 edition), and the test results are shown in Table 10.

TABLE 10

| Test data for killing microorganisms | | | |
|---|---|---|---|
| | Microorganism killing indicators | | |
| Testing disinfectant | *Staphylococcus aureus* Time taken when the average killing logarithmic value ≥ 5.00 | *Pseudomonas aeruginosa* Time taken when the average killing logarithmic value ≥ 5.00 | Candida albicans Time taken when the average killing logarithmic value ≥ 5.00 |
| Comparative example 1 | 5 min | 5 min | 5 min |
| Comparative example 2 | 5 min | 5 min | 5 min |
| Comparative example 3 | 5 min | 5 min | 5 min |
| Example 1 | 0.5 min | 0.5 min | 0.5 min |
| Example 2 | 0.5 min | 0.5 min | 0.5 min |
| Example 3 | 0.5 min | 0.5 min | 0.5 min |
| Example 4 | 0.5 min | 0.5 min | 0.5 min |
| Example 5 | 0.5 min | 0.5 min | 0.5 min |
| Example 6 | 0.5 min | 0.5 min | 0.5 min |
| Example 7 | 0.5 min | 0.5 min | 0.5 min |
| Example 8 | 0.5 min | 0.5 min | 0.5 min |
| Example 9 | 0.5 min | 0.5 min | 0.5 min |
| Example 10 | 0.5 min | 0.5 min | 0.5 min |

It can be seen from the table above that, when the action time was shortened from 5 min to 0.5 min, the composite quaternary ammonium salt disinfectants obtained in the inventive examples achieved the same bactericidal effect, as compared with the disinfectants obtained in the Comparative examples.

Test 9: Toxicological Indicators

A test for toxicological indicators was conducted using the sample of Example 1 as a testing disinfectant according to the method of 2.3.1, 2.3.2, 2.3.3, 2.3.4 and 2.3.8 in Technical Standard for Disinfection (2002 edition), and the test results are shown in Table 11.

TABLE 11

Toxicological indicators

| Items | Test results |
|---|---|
| Acute oral toxicity | The acute oral toxicity LD50 for mice was greater than 5000 mg/Kg, which was actually nontoxic according to the acute toxicity evaluation rules of Technical Standard for Disinfection (2002 edition). |
| Acute inhalation toxicity | The acute inhalation toxicity Lc50 for mice was greater than 10000 mg/$m^3$, which was actually nontoxic according to the acute toxicity evaluation rules of Technical Standard for Disinfection (2002 edition). |
| Mutagenicity test | No chromosome damage occurred in mice. |
| Multiple skin irritation tests (repeated use) | After continuous application for 14 days, no swelling and edema occurred in rabbits, which was considered as non-irritative according to 2.3.3 Grading standard of skin irritation intensity of Technical Standard for Disinfection (2002 edition). |
| Multiple acute eye irritation tests (repeated use) | During the observation period, no conjunctival congestion, conjunctival edema, iris injury and corneal opacity occurred in rabbits, which was considered as non-irritative according to 2.3.4 Grading standard of eye irritation of Technical Standard for Disinfection (2002 edition). |

Finally, it should be noted that the above examples are only used to illustrate the technical solutions of the present invention and not to limit it; although the present invention has been described in detail with reference to the foregoing examples, it will be understood by one of ordinary skill in the art that the technical solutions described in the foregoing examples can still be modified or some technical features can be equivalently substituted; however, these modifications or substitutions do not make the essence of the corresponding technical solutions depart from the spirit and scope of the technical solutions of various examples of the present invention.

INDUSTRIAL APPLICABILITY

The composite quaternary ammonium salt disinfectant provided by the invention has a synergistic effect among its components, which greatly improves the capacity of resisting interferences by hard water and organics; and can kill not only bacterial propagules, lipophilic viruses (enveloped viruses, such as novel coronavirus) and fungi, but also hydrophilic viruses (non-enveloped viruses). In addition, the composite quaternary ammonium salt disinfectant provided by the invention has the following advantages: having a rapid speed of kill, easy to use, non-toxic, non-irritative, and non-corrosive, and can be used for disinfecting various surfaces, air, hands, skin, mucous membranes, etc., as well as water bodies, aquaculture industries and other fields, which is suitable for large-scale promotion and shows a good market prospect.

The invention claimed is:

1. A composite quaternary ammonium salt disinfectant, wherein the raw materials thereof comprise: a double long-chain quaternary ammonium salt, two single long-chain quaternary ammonium salts, a synergist isothiazolinone, a nonionic surfactant fatty alcohol polyoxyethylene ether, and water;

the double long-chain quaternary ammonium salt is one or more selected from the group consisting of didecyl dimethyl ammonium chloride, dioctyl dimethyl ammonium chloride, and octyl decyl dimethyl ammonium chloride;

the two single long-chain quaternary ammonium salts are alkyl dimethyl benzyl ammonium chloride with an alkyl chain length of C12-C16 or dodecyl dimethyl benzyl ammonium chloride; and alkyl dimethyl (ethylbenzyl) ammonium chloride with an alkyl chain length of C12-C14, respectively;

the synergist isothiazolinone is one or more selected from the group consisting of 2-methyl-4-isothiazolin-3-one, 2-octyl-4-isothiazolin-3-one, 1,2-benzisothiazolin-3-one, and a mixture of 2-methyl-5-chloro-4-isothiazolin-3-one and 2-methyl-4-isothiazolin-3-one in a mass ratio of 3:1;

the fatty alcohol polyoxyethylene ether is C12-C14 fatty alcohol polyoxyethylene (9) ether;

the total concentration of the double long-chain quaternary ammonium salt and the two single long-chain quaternary ammonium salts in the composite quaternary ammonium salt disinfectant ranges from 2.0 g/L to 200 g/L (w/v);

the mass ratio of the double long-chain quaternary ammonium salt to the two single long-chain quaternary ammonium salts is 1:0.20-1.0:0.20-1.0;

the content of the synergist ranges from 0.01% to 1.0% (w/w); and the content of the nonionic surfactant ranges from 1.0% to 20% (w/w).

2. The composite quaternary ammonium salt disinfectant according to claim 1, wherein the composite quaternary ammonium salt disinfectant further comprises one or more synergists selected from urotropine and o-phthalaldehyde;

and/or, the composite quaternary ammonium salt disinfectant further comprises one or more nonionic surfactants selected from glycosides, poloxamer, and polyvinyl alcohol.

3. The composite quaternary ammonium salt disinfectant according to claim 1, wherein the total concentration of the double long-chain quaternary ammonium salt and the two single long-chain quaternary ammonium salts in the composite quaternary ammonium salt disinfectant ranges from 5.0 g/L to 150 g/L (w/v), and further optionally from 10 g/L to 100 g/L (w/v).

4. The composite quaternary ammonium salt disinfectant according to claim 1, wherein the content of the synergist ranges from 0.02% to 0.5% (w/w), and further optionally from 0.03% to 0.3% (w/w);

and/or, the content of the nonionic surfactant ranges from 1.5% to 15% (w/w), and further optionally from 2.0% to 10% (w/w).

5. The composite quaternary ammonium salt disinfectant according to claim 1, wherein the composite quaternary ammonium salt disinfectant further comprises a pH modifier and/or alcohols;

the pH modifier is two or more selected from the group consisting of EDTA-4Na, EDTA-2Na, EDTA, potassium dihydrogen phosphate, dipotassium hydrogen phosphate, sodium dihydrogen phosphate and disodium hydrogen phosphate; optionally, the pH modifier is two or more selected from the group consisting of EDTA-4Na, EDTA-2Na, EDTA, potassium dihydrogen phosphate and dipotassium hydrogen phosphate; further optionally, the pH modifier is selected from two or three of EDTA-4Na, EDTA-2Na and EDTA;

the alcohols are one or more selected from the group consisting of ethanol, propanol, isopropanol, dipropylene glycol, dipropylene glycol propyl ether, dipropylene glycol butyl ether, ethylene glycol, 1,2-propylene glycol, 1,3-propylene glycol, 1,2-butylene glycol, 1,2-pentanediol, 1,2-hexanediol, 1,2-heptanediol, 1,2-octanediol, 1,2-nonanediol, and 1,2-decanediol; optionally, the alcohols include one or more of ethanol, dipropylene glycol, dipropylene glycol propyl ether, dipropylene glycol butyl ether, ethylene glycol, 1,2-butanediol, 1,2-pentanediol, 1,2-hexanediol, 1,2-heptanediol, 1,2-octanediol, 1,2-nonanediol, and 1,2-decanediol; further optionally, the alcohols include one or more of ethanol, dipropylene glycol, dipropylene glycol propyl ether, dipropylene glycol butyl ether, 1,2-hexanediol and 1,2-octanediol.

6. The composite quaternary ammonium salt disinfectant according to claim 5, wherein, the content of the alcohols ranges from 0.5% to 15% (w/w), optionally from 0.8% to 10% (w/w), and further optionally from 1.0% to 8% (w/w);

and/or, the content of the pH modifier ranges from 0.2% to 15% (w/w), optionally from 0.5% to 10% (w/w), and further optionally from 2% to 5% (w/w).

7. A method for preparing the composite quaternary ammonium salt disinfectant according to claim 1, wherein the method comprises the steps of dissolving each component in purified water and stirring; optionally, the method further comprises the step of dilution after stirring and dissolving.

* * * * *